(12) United States Patent
Wolf et al.

(10) Patent No.: US 10,868,474 B2
(45) Date of Patent: Dec. 15, 2020

(54) CIRCUIT BOARD, METHOD FOR DETERMINING A CURRENT SPACE VECTOR, CONVERTER, CIRCUIT BOARD AND SERIES OF CONVERTERS

(75) Inventors: Harald Wolf, Ubstadt-Weiher (DE); Manuel Heil, Rheinstetten (DE); Ralf Bennerscheidt, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 366 days.

(21) Appl. No.: 12/937,840

(22) PCT Filed: Mar. 21, 2009

(86) PCT No.: PCT/EP2009/002102
§ 371 (c)(1),
(2), (4) Date: Oct. 14, 2010

(87) PCT Pub. No.: WO2009/127313
PCT Pub. Date: Oct. 22, 2009

(65) Prior Publication Data
US 2011/0062934 A1   Mar. 17, 2011

(30) Foreign Application Priority Data
Apr. 14, 2008 (DE) .......... 10 2008 018 885

(51) Int. Cl.
*H02M 7/48* (2007.01)
*H02M 1/00* (2006.01)
(52) U.S. Cl.
CPC ...... *H02M 7/48* (2013.01); *H02M 2001/0009* (2013.01)

(58) Field of Classification Search
CPC ..... H02M 2001/0009; H02M 7/53873; H02M 7/53871; H02M 7/53875; H02P 27/06;
(Continued)

(56) References Cited

U.S. PATENT DOCUMENTS 4,523,153 A * 6/1985 Itoh .................. H03G 1/0023
                                                  330/254
5,406,150 A   4/1995 Austin
(Continued)

FOREIGN PATENT DOCUMENTS

DE    196 81 189    1/1998
DE    102 48 375    5/2003
(Continued)

OTHER PUBLICATIONS

Parasiliti, et al., "*Low Cost Phase Current Sensing in DSP Based AC Drives*," Industrial Electronics 1999, ISIE'99, Proceedings of the IEEE, vol. 3, pp. 1284-1289, 1999.
(Continued)

*Primary Examiner* — Adolf D Berhane
(74) *Attorney, Agent, or Firm* — Carter, DeLuca & Farrell LLP

(57) ABSTRACT

In circuit board for a converter, including control electronics, the circuit board includes a device for current detection, the device respectively having at least two measuring amplifier circuits, only the output of one of the measuring amplifier circuits being supplied as the detected current value to the control electronics of the converter.

20 Claims, 9 Drawing Sheets

(58) Field of Classification Search
CPC ..... H02P 6/002; H02P 7/539; G01R 19/0092;
G01R 19/08; H03K 17/081; H03K 17/16
USPC .................... 323/300, 304, 311, 316; 363/17
See application file for complete search history.

(56) References Cited

U.S. PATENT DOCUMENTS

| | | | |
|---|---|---|---|
| 5,815,391 A | 9/1998 | Pelly | |
| 5,969,958 A | 10/1999 | Nielsen et al. | |
| 6,301,137 B1 | 10/2001 | Li | |
| 7,102,327 B2 * | 9/2006 | Ho | H02P 8/12 |
| | | | 318/599 |
| 7,423,403 B2 * | 9/2008 | Watanabe | H02M 7/53873 |
| | | | 318/599 |
| 2004/0062062 A1 * | 4/2004 | Lee | H02P 21/36 |
| | | | 363/37 |

FOREIGN PATENT DOCUMENTS

| | | |
|---|---|---|
| DE | 103 54 130 | 6/2005 |
| GB | 2 437 696 | 10/2007 |
| JP | 2003114244 A | 4/2003 |
| WO | 2003/041258 | 5/2003 |

OTHER PUBLICATIONS

Nguyen, et al., "*Praxis der feldorientierten Drehstromantriebsregelungen,*" Second Edition, pp. 110-113, 1999.

\* cited by examiner

| Winkel-bereich | α | R | S | T |
|---|---|---|---|---|
| 1 | $0 \ldots 1/3*\pi$ | $I_{Rmoff}$ | ↯ | ↯ |
| 2 | $1/3*\pi \ldots 2/3*\pi$ | ↯ | $I_{Smoff}$ | ↯ |
| 3 | $2/3*\pi \ldots \pi$ | ↯ | $I_{Smoff}$ | ↯ |
| 4 | $\pi \ldots 4/3*\pi$ | ↯ | ↯ | $I_{Tmoff}$ |
| 5 | $4/3*\pi \ldots 5/3*\pi$ | ↯ | ↯ | $I_{Tmoff}$ |
| 6 | $5/3*\pi \ldots 2\pi$ | $I_{Rmoff}$ | ↯ | ↯ |

Fig. 8

| Winkel-bereich | α | R | S | T |
|---|---|---|---|---|
| 1 | $0...1/3*\pi$ | $I_{RMoff}$ | ↓ | ↓ ↓ |
| 2 | $1/3*\pi...2/3*\pi$ | ↓ | $I_{SMoff}$ | ↓ ↓ |
| 3 | $2/3*\pi...\pi$ | ↓ ↓ | $I_{SMoff}$ | ↓ |
| 4 | $\pi...4/3*\pi$ | ↓ ↓ | ↓ | $I_{TMoff}$ |
| 5 | $4/3*\pi...5/3*\pi$ | ↓ | ↓ ↓ | $I_{TMoff}$ |
| 6 | $5/3*\pi...2\pi$ | $I_{RMoff}$ | ↓ ↓ | ↓ |

CIRCUIT BOARD, METHOD FOR DETERMINING A CURRENT SPACE VECTOR, CONVERTER, CIRCUIT BOARD AND SERIES OF CONVERTERS

FIELD OF THE INVENTION

The present invention relates to a circuit board, a method for determining a current space vector, a converter, a circuit board and a series of converters.

BACKGROUND INFORMATION

In a digitally controlled converter operated in a pulse-width modulated manner on the side of the output voltage it is necessary for achieving a sufficient control performance to determine for a pulse-width modulation period a value for the current space vector that corresponds to the average value of the real existing current space vector formed over this pulse-width modulation period. In the case of an inductive load, as in an electric motor in particular, the pulse-width modulated output voltage results in a so-called current ripple. The determination of the current space vector must not be influenced by this current ripple. In some converters of the related art, the current sensors are situated in the incoming lines to the motor, which results in continuous current signals that are freed from the current ripple by analog filtering and are then utilizable for the control.

The book, 'Praxis der feldorientierten Drehstromantriebsregelungen' ('The Practice of Field-Oriented Alternating Current Drive Controls') by Nguyen Phung Quang and Jörg-Andreas Dittrich, second edition, 1999, pages 110-113, describes converters capable of being operated in a pulse-width modulated manner, in which current detections are provided with the aid of three (FIG. 5.1) or only two (FIGS. 5.3, 5.5, 5.6, 5.9, 5.11) potential-separating current sensors in the output branches. For this purpose, a current space vector having two degrees of freedom is determined from the current measuring values (FIGS. 5.3, 5.5, 5.6, 5.9, 5.11). Furthermore, pages 76 through 77 explain that the current measuring values must be detected at suitable times in order to detect the fundamental component of the motor currents without harmonic components, that is, without current ripple. In this context, the deviation from the fundamental component is called the differential current space vector. The current measuring values are then detected in the zero crossing of the differential current space vector. These known converters have the disadvantage that at least two expensive, potential-separating current measuring devices are required.

German Published Patent Application No. 196 81 189 describes a converter operable in a pulse-width modulated manner having an intermediate circuit capacitor (FIG. 1, reference numeral 3) and an output stage connected to it, which includes only one current sensor for detecting the intermediate circuit current. Depending on the angle of the output voltage vector, the current detection thus contains the information about an individual phase current or sums of phase currents. The disadvantage is that at certain angles of the output voltage vector it is not possible to determine a current space vector in a satisfactory manner.

The document by Francesco Parasiliti, "Low Cost Current Sensing in DSP Based Drives", Industrial Electronics, 1999, ISIE'99, Proceedings of the IEEE, Volume 3, 1999, International Symposium, Volume 3, 1999, describes a converter in which shunt resistors are situated in all lower branches of the half-bridges as a device for detecting the respective currents. All three current measuring values are detected, the measuring impulses occurring at the midpoint of the time segment within a pulse-width modulation period in which the discrete switching state (000), that is, the zero vector $v_0$ is applied (page 1287, left column and FIG. 7). In the described embodiment, there is a small time offset with respect to this midpoint for the purpose of taking dead times, signal propagation times and the like into account. The current space vector is then determined from the associated measuring values. The disadvantage in this regard, however, is that the current space vector cannot be determined or can be determined only imprecisely in the shaded regions of the hexagon (page 1287, left column, last paragraph and FIG. 8) since in these shaded regions either no zero vector is used or only very briefly. For if the zero vector is not present or is applied only very briefly, automatically no current measuring signal or only a very brief current measuring signal exists in a phase, which is thus not available or only very imprecisely available for an evaluation. As a result, at least one current measuring value is falsified in the case of an output voltage space vector from the shaded area that is averaged over a pulse-width modulation period (page 1287, FIG. 8).

U.S. Pat. No. 5,815,391 describes a converter, in which a device for detecting the respective currents is situated in all lower branches of the half-bridges (FIG. 2A). The associated table (FIG. 2B) explains that the current in phase A is measurable as a function of the switching states (by way of example, line 1: measurable;) or is computable from the two other current measuring values (line 5: computable;). However, if the lower switch of phase A and another lower switch are open, then the current measuring value of phase A cannot be determined. Such switching states are marked as 'unknown' in phase A in this document.

The mentioned table 2B and the described problem related to the switching states, that is, the respective momentary state of the converter.

The mentioned table 2B only relates to phase A. The associated tables for phases B and C may be compiled however. It is then easy to see that in some switching states, namely, (111), (110), (101), (011), no or only one current measuring value may be determined and thus in no way a current space vector for these momentary states. U.S. Pat. No. 5,815,391 thus does not show how a current space vector is to be determined which corresponds to the average value of the real existing current space formed over a pulse-width modulation period. In particular, it is now shown how to proceed so that the current space vector is not falsified by current ripples.

The duration of a 'known' switching state within a pulse-width modulation period depends on the following factors: the carrier frequency of the pulse-width modulation, the type of pulse-width modulation method. If this duration of a 'known' switching state is too short, the current space vector cannot be determined.

This document does not explain in more detail how the pulse-width modulation method is carried out; but it is clear to one skilled in the art that this document teaches that these 'unknown' states present a problem. Column 1, line 40-44 speaks of a 'back calculation', which is not described in an implementable manner, however. The document teaches one skilled in the art that the problem of the 'unknown' states can be avoided in that, as shown in FIGS. 5 and 6, measuring means, in particular potential-free measuring means such as Rogowski coils or the like, are used both in the upper as well as in the lower branches of the half-bridges. By skillful combination of the measuring signals, in particular by the addition of the measuring signals of the lower and the upper measuring device, a continuous current measuring signal is achieved and the 'unknown' states no longer present a problem.

This teaching of U.S. Pat. No. 5,815,391, to use measuring devices both in the upper as well as in the lower branches of the half-bridges, would also be applicable to the aforementioned IEEE document. In this manner, the current measurement in the shaded regions would be feasible without problem and with precision. However, elaborate measuring devices, in particular ones for overcoming the potential barrier and thus expensive measuring means, would have to be provided. The solutions would therefore be very elaborate and expensive.

SUMMARY

Example embodiments of the present invention provide a converter, in which as many costly parts as possible may be omitted and for which a cost-effective manufacture is possible particularly in mass production and by which nevertheless a method is implementable for determining a current space vector.

According to example embodiments of the present invention, it is provided for determining a current space vector, in particular for use in a control and/or regulating method, for a converter operated in a pulse-width modulated manner, including a signal electronics, a power output stage having power switches situated in three half-bridges having respectively one lower and one upper branch and a device for sampling the respective currents situated in the three upper or lower branches of the half-bridge, the device for sampling being operated at optionally different amplification.

An advantage in this regard is that the amplification is modifiable in operation as required and thus the current resolution is accordingly adaptable to operating states. Alternatively, a first amplification is activatable and usable when using a first type of power switches and/or shunt resistors and a second amplification is activatable and usable in a second type of power switches and/or shunt resistors. Within one series it is thus possible always to use the same control electronics with measuring amplification circuits of the current detection—even when different power switches are used.

The device may respectively include one amplifier circuit, the respective amplification of which is optionally adjustable to different values. An advantage in this regard is that the amplification has accordingly adapted values depending on the mentioned requirement.

The device may in particular include respectively two optionally operable amplifier circuits, the respective amplification of which differs.

The amplification may be switched over while the control and regulating method is running, in particular for achieving a better resolution in the current detection. An advantage in this respect is that a suitable resolution may be selected depending on the operating state.

The same device for sampling may be used in different power switches, the switches being utilizable for maximum admissible currents or powers of different magnitude. An advantage in this regard is that a high variance of converters is producible while using a small number of parts and thus low storage costs.

After modifying the amplification of the current detections associated with a respective phase, first the offset and/or the amplification of the current detection associated with the respective phase may be determined and subsequently taken into account. An advantage in this regard is that the current detection may be implemented in an improved manner and that the switchover may thus be implemented in a manner free from interference. Moreover, the current detection of the phase currents is implementable in a more uniform manner and thus an improved control behavior is achievable.

A current may be applied and determined in order to determine the amplification in the respective bridge branch. An advantage in this regard is that a defined current is provided and thus the determination of the amplification in the different bridge branches associated with the phases is made possible in a uniform manner.

Among the features of the converter are, in particular of the converter operated in a pulse-width modulated manner, that the converter includes signal electronics, a power output stage having power switches situated in three half-bridges each having one lower and one upper branch as well as a device for sampling the respective currents situated in the three upper or lower branches of the half-bridge, the device for sampling being operable at different amplification as a function of the state of a selection device.

In particular, each device includes at least two amplifier circuits, only one being operated respectively. Hardware components such as the circuit board with the signal electronics, including the measuring amplifier of the current detection, may be usable multiple times, that is, are usable in different power classes of power semiconductor switches. Thus it is possible to produce a great variance using a small number of parts.

The selection device may be arranged as a selector switch or as another device implemented in hardware. An advantage of this is that the switch is implementable in a simple manner.

The selection device may be arranged as a parameter value or another system implemented in software. An advantage in this regard is that no additional hardware is required.

Among the features of the circuit board are that it is provided for a converter, the converter including control electronics, the circuit board including at least a device for current detection, the device respectively having at least two measuring amplifier circuits, only the output of one of the measuring amplifier circuits being supplied as a detected current value to the control electronics of the converter.

An advantage in this regard is that the circuit board is usable for different types of power electronics, in particular for different power classes of power electronics.

Among the features of the circuit board are that it is provided for a converter, the converter including control electronics, the circuit board including at least a device for current detection, the device having respectively one measuring amplifier circuit switchable to at least two measuring amplifications, a control line being provided from the control electronics to the measuring amplifier circuit for controlling the switchover.

An advantage in this regard is that the amplification may be switched over during operation, that is, while the control method is running, and thus the resolution of the current detection is modifiable and adaptable to the respective need. Thus a regulating method in a specially selected operating range may be carried out in an improved manner.

Among the features in the series of converters are that the series includes at least a first and a second variant of converters, the variants differing at least in the maximally admissible nominal power, an identical circuit board being provided in all variants, which includes at least the measuring amplifier circuits of the current detection, two measuring amplifier circuits being assigned to each current detection, only the output of one of the measuring amplifier circuits being supplied as the detected current value to the control electronics of the converter.

A high variance may be achievable in the series with a small number of parts.

Among the features in a series of converters are that the series includes at least a first and a second variant of converters, the variants differing at least in the maximally admissible nominal power, an identical circuit board being provided in all variants, which includes at least the measuring amplifier circuits of the current detection, a measuring amplifier circuit switchable to at least two measuring amplifications being assigned to each current detection, a control line being provided from the control electronics to the measuring amplifier circuit for controlling the switchover.

An advantage in this regard is that a switchover is possible in operation, that is, while the regulating method is running.

For determining the measuring amplifications, a current of identical magnitude may be applied to each phase and then determined, and from this the measuring amplification associated with the respective phase may be determined. An advantage in this regard is that a defined current is specifiable, from which it is possible to determine the amplification, in particular in a uniform manner for all current phases.

For determining the offset of the current detection associated with a respective phase, the current may be detected in a bridge branch that is switched off, in particular prior to determining the respective measuring amplification. An advantage in this regard is that the amplification may be determined in an improved manner and with higher precision.

A current of identical magnitude may be applied to each phase and then determined, and from this the measuring amplification associated with the respective phase may be determined.

An advantage in this regard is that the detected current values are adjustable, in particular adaptable. Consequently, a current detection may be provided that is uniform for all three phases. That is, the detected current is not distorted. If for example a current vector occurs that is constant in terms of absolute value, then the reconstruction of the current space vector is undistorted following the detection of the three phase currents, that is, it is uniform even independently of the angular position.

For determining the offset of the current detection associated with a respective phase, the current may be detected in a bridge branch that is switched off, in particular prior to determining the respective measuring amplification. An advantage in this regard is that the offset is subtractable from the measuring result and thus a further improved current detection is made possible. In interaction thus a very precise detection of the current space vector is made possible, the amount of the current space vector depending on the absolute value of the measuring amplifications, which remain unknown.

Example embodiments of the present invention, however, allow for the current space vector to be determined without angular distortion, and even allows it to be determined without offset. In this manner, the torque model value formation of the converter control is very good and the control characteristics, such as the control performance, are greatly improved.

The converter may be equipped with an output stage including bridge branches such in a first step at least one upper and the associated lower bridge branch, which are assigned to a first phase, are switched off, and the upper bridge branch that is assigned to a second phase and the lower bridge branch that is assigned to a third phase are switched on, in particular whereby a unipolar current is applied, in particular for a time period of such a length that a constant current is applied, in at least the switched-on bridge branch at least one current sampling value is determined by the device for sampling the current and from this the active measuring value amplification assigned to the switched-on bridge branch is determined and taken into account for the current detection, in a second step and third step the first step is repeated, the bridge branches assigned to the three phases being respectively switched in a cyclical manner.

An advantage in this regard is that an adjustment of the measuring amplifications in the individual phases is made possible simply and quickly, in particular in a very short time, without additional devices beyond the devices necessary for the current detection. In the process, a current is applied by the application of a voltage only until a steady state is achieved. That is, only additional software is required to implement example embodiments of the present invention.

In a respective intermediate step, which follows the mentioned respective first, second and third step, instead of the respectively switched-on upper bridge branch, the associated lower bridge branch of the same phase is switched on, and, instead of the respectively switched-on lower bridge branch, the upper bridge branch is switched on, whereby in particular the applied current direction is reversed. In particular, the respective intermediate step follows immediately upon the first, second and third step, that is, the first step is followed by an intermediate step and likewise the second by a corresponding intermediate step and likewise the third by a corresponding intermediate step. An advantage in this regard is that the polarity of an applied current is reversed and thus the measuring amplifications may be determined in a torque-free manner.

For the control method, the detected current measuring values may be divided, as current measuring values associated with the respective phase, by the measuring amplification associated with the respective phase, that is, in particular, normalized current measuring values are used. An advantage in this regard is that a mutual adjustment of the measuring amplifications of the phases is made possible in a simple manner.

For determining the offset of the current detection associated with a respective phase, the current may be detected in a bridge branch that is switched off, in particular prior to determining the respective measuring amplification. An advantage in this regard is that the offset may be determined in a particularly simple manner.

In example embodiments, for controlling the half-bridges, a pulse pattern is generated within a time period, which amounts to a pulse-width modulation period, such that at a first sampling time within the pulse-width modulation period respectively at least one upper or one lower bridge branch equipped with a device for sampling the current is switched off, in the switched-off bridge branch at least one current sampling value is determined by the device for sampling the current, and from this an active offset value is determined and taken into account for the current detection, the switched-off bridge branch is selected variously as a function of the average output voltage space vector and the current space vector is determined from the current sampling values, the average output voltage space vector being determined by the differences of the output potentials of the three output phases averaged over a pulse-width modulation period.

An advantage in this regard is that the offset determination may be implemented in a simple manner in a converter.

In example embodiments, for controlling the half-bridges, a symmetrical pulse pattern is generated within a time period, which amounts to one pulse-width modulation period, such that at an additional sampling time at the midpoint of the pulse-width modulation period respectively one pair of the three upper or one pair of the three lower bridge branches equipped with the device for sampling the current are switched on, in each of the two switched-on bridge branches at least one current sampling value is determined by the device for sampling the current, the pair of switched-on bridge branches is variously selected as a function of the average output voltage space vector and the current space vector is determined from the current sampling values, the average output voltage space vector being determined by the differences of the output potentials of the three output phases averaged over a pulse-width modulation period.

In particular, for controlling the half-bridges, a pulse pattern is generated within a time period, which amounts to one pulse-width modulation period, such that at a first sampling time within the pulse-width modulation period respectively at least one upper or one lower bridge branch equipped with a device for sampling the current is switched off, in the switched-off bridge branch, at least one current sampling value is determined by the device for sampling the current, and from this an active offset value is determined and taken into account for the current detection, the switched-off bridge branch is selected variously as a function of the average output voltage space vector and the current space vector is determined from the current sampling values, the average output voltage space vector being determined by the differences of the output potentials of the three output phases averaged over a pulse-width modulation period.

An advantage in this regard is that an active offset value is determined and thus an offset-freed detection of the current is made possible, which makes a better control behavior achievable. Even in a possibly occurring temperature drift of the offset value of the measuring amplifier, an always actively valid value is determined. Since in operating modes customary in industry, the drift has a characteristic time constant that is greater than in a pulse-width modulation period belonging to a pulse-width modulation frequency in the range between 1 kHz and 100 kHz, it is not necessary to determine an offset value in each pulse-width modulation period, but rather it suffices to do this at greater time intervals. Moreover, no sample-hold circuit is necessary, even though current measuring values for multiple phases are detectable and only one analog/digital converter is required.

Since in the variant having a device for detecting the respective currents situated in all three lower branches of the half-bridges it is always the case that the phase, in which the corresponding pulse-width modulation signal is shorter than a minimum duration in the LOW state, is not used, a reliable determination of the current space vector is ensured while using a suitable pulse-width modulation method, in particular a symmetrical pulse-width modulation method. In the respective LOW state, the lower power switch is closed and the upper power switch is open. In a HIGH state, the reverse is the case.

Moreover, as many costly parts as possible are dispensable, in particular potential-separating current sensors, since the currents are not measured in the output branches, but rather in the lower or upper branches of the half-bridges. A cost-effective manufacture is achievable in mass production.

In particular, using the two of the three device for detecting the currents the associated current sampling values are not detected simultaneously within the pulse-width modulation period and/or the associated measuring impulses are not carried out simultaneously. An advantage in this regard is that in the converter it is possible to use a microcontroller having only one single analog-digital converter and no additional sample-hold circuit, that is, no sample-hold circuit situated externally of the microcontroller.

In particular, using at least one of the two devices, a current sampling value is detected more than once per pulse-width modulation period and/or more than one measuring impulse is provided within a pulse-width modulation period.

In particular, using a first of the two devices, a current sampling value is detected exactly twice per pulse-width modulation period, and the measuring impulse for the second of the two devices is at the midpoint of the pulse-width modulation period. Advantageously, the two measuring impulses of the first of the two devices occur equidistant from the midpoint of the pulse-width modulation period, that is, the time interval from the first measuring impulse of the first device to the first measuring impulse of the second device is of equal magnitude as the time interval from the measuring impulse of the second device to the second measuring impulse of the first device and the last-mentioned measuring impulse of the second device is at the midpoint of the pulse-width modulation period.

In the variant having a device for detecting the respective currents situated in all three lower branches of the half-bridges, the midpoint in time of the pulse-width modulation period indicates the midpoint in time of the respective LOW states. During these states, current measuring signals exist on the device for detecting the respective currents.

For determining the current space vector, the current measuring values of the phases associated with the two mentioned devices suffice. The altogether three current measuring values of the two devices are always available because an advantageous pulse-width modulation method is used, such as for example a symmetrical pulse-width modulation method, and the output voltage space vector is limited to the incircle of the hexagon. This also means for example that no corner vectors of the hexagon occur permanently over an entire pulse-width modulation period.

So that the current space vector remains free from the current ripples caused by the pulse-width modulation, the measuring impulses must occur at suitable times. For this purpose, it would be advantageous to set the times of the measuring impulses of the two devices respectively simultaneously and at the midpoint of the pulse-width modulation period. In that case, however, either two A/D converters or external sample-hold circuits would be required, which would be costly. Using the first device, however, two temporally offset measuring impulses are performed. The time of the measuring impulse of the second device is set to the midpoint of the pulse-width modulation period. The times of the two measuring impulses of the first device respectively have the same time interval with respect to the midpoint of the pulse-width modulation period. Thus, as a result of the averaging and due to the symmetry of the current ripple, which extends symmetrically with respect to the midpoint of the pulse-width modulation period on account of the symmetrical pulse-width modulation method, a current measuring value is determined by using the first device, which is identical to the current measuring value that would be measurable using the first device at the time of the midpoint of the pulse-width modulation period.

In particular, the current space vector is determined for each pulse-width modulation period. An advantage in this regard is that it is possible to provide for a frequent determination of the current space vector even in the case of a small pulse-width modulation frequency so as to improve the control performance of the control method of the converter.

The first sampling time may be at the midpoint of the pulse-width modulation period or at the midpoint of a time period, during which the respective bridge branch is switched off. Advantageously, a current occurring in the previous time period has thus faded and no residual currents persist.

Multiple first sampling times may respectively be within a first time period and the average value of the detected current measuring values is used to determine the offset value. An advantage in this regard is that via a multiplexer the measuring values are detectable using only one analog/digital converter, which makes the current measuring values of different bridge branches detectable in temporal succession.

In another switched-off bridge branch, current sampling values may be detected symmetrically in time before and after the first sampling time for determining the offset value. An advantage in this regard is that the detected values for different switched-off bridge branches substantially correspond to a time-synchronous detection.

The current measuring signals may be formed on the lower intermediate circuit potential, current measuring values associated with the respective half-bridges being determined from current sampling values that are derived from the current measuring signals. In particular, the reference potential of the signal electronics, which includes a control and regulating device of the converter, corresponds to the reference potential, on which the current measuring signals are formed. An advantage in this regard is that optocouplers for potential separation are dispensable. The reference potential of the signal electronics also has the lower intermediate circuit potential. An advantage in this regard is that the control signals of the lower power switches in the half-bridges may be generated by the signal electronics without the occurrence of a high voltage interval, which would necessitate an elaborate potential separation. Only the control signals of the upper power switches have to be controlled via optocouplers or other potential-separating devices. In particular in a converter that has no terminals for a sensor, such as a rotational speed sensor or position sensor, or for other potential-separating devices, a step in saving costs and reducing the number of parts is thus achievable.

Advantageously, power semiconductor switches, such as IGBT of the type npn, may be used as lower power switches in the half-bridges, which are controllable by control voltages that have the lower intermediate circuit potential as reference potential.

When using complementary power semiconductor switches, such as IGBT of the type pnp for example, then the upper intermediate circuit potential is to be selected as the reference potential for the current measurement and for the signal electronics, and the converter must be designed accordingly.

The pair may be selected as a function of the angle of the output voltage space vector and not different from the pulse-width modulation pattern. An advantage in this regard is that the software implementation is particularly simple.

A time period of two or more pulse-width modulation periods may be used instead of the one pulse-width modulation period. An advantage in this regard is that the current space vector is determinable even at a high switching frequency. In this instance, there is indeed a slight falsification, but it is low at a high switching frequency.

The detection of the current sampling value detected by the first current measuring device, that is, by the device for detecting the currents, is performed at the midpoint of the pulse-width modulation period. In particular, using a second of the two current measuring devices, a first and a second associated current sampling value is detected symmetrically before and after the detection of a current sampling value detected using the first current measuring device. An advantage in this regard is that using only one analog-digital converter without external sample-hold circuits current measuring values are determinable, which are not falsified by current ripples caused by pulse-width modulation. The current measuring values may thus be determined in a particularly simple manner and at a low computing expenditure.

When using additional external sample-hold circuits, it would be possible to detect the associated current sampling values simultaneously and/or to perform the associated measuring impulses simultaneously using the two of the three devices for detecting the currents. In particular, the measuring impulses would be implemented at the midpoint of the pulse-width modulation period. An advantage in this regard would be that the determination of the current measuring values is particularly simple and nevertheless there exist no falsifications caused by current ripples.

Using the first of the two devices for detecting the currents, an associated current sampling value is detected at least one pulse-width modulation period after the detection of a current sampling value associated with the second device for detecting the currents. In particular, the measuring impulses associated with the two devices for detecting the currents are in different pulse-width modulation periods. An advantage in this regard is that even at high switching frequencies a current space vector is determinable using only one single analog-digital converter and without additional sample-hold circuits, in particular without falsifications caused by current ripples.

The first current sampling value of the pair is detected more than once per pulse-width modulation period, and a value interpolated according to the times of the respective detection and/or an average value is formed from the detected values. In particular, a first current sampling value of the pair, which is associated with a first half-bridge, is detected before and after the second current sampling value of the pair, which is associated with a second half-bridge. An advantage in this regard is that through interpolation or also through averaging a fictitious current measuring value is determinable with good accuracy, which exists at the same time as the other detected current sampling value.

The detected current space vector may correspond to the average value of the current space vector over a pulse-width modulation period. An advantage in this regard is that the current ripple existing as a consequence of the pulse-width modulation does not falsify the result and thus also does not falsify the control methods.

Among features of the converter, including signal electronics and a power output stage, which includes power switches situated in three half-bridges having respectively a lower and an upper branch, the converter being operable in a pulse-width modulated manner, are that devices for detecting the respective currents are situated either in all three lower or in all three upper branches of the half-bridges, current measuring signals detected by the three devices for detecting the currents are supplied and/or are suppliable via a multiplexer to only one single analog-digital converter.

An advantage in this regard is that costly potential-separating devices are dispensable and the unit volume of the converter may be reduced.

The devices for current detection may include resistors, in particular shunt resistors. An advantage in this regard is that the current detection is extremely cost-effective.

The devices for current detection may be situated in the half-bridges such that they are connected either to the upper or to the lower intermediate circuit potential. An advantage in this regard is that a device for potential separation is dispensable. The signal electronics may have a reference potential, which is also the reference potential for the device for current detection. If this reference potential is Uz−, then it is possible to dispense with the device for potential separation for the control signals of the lower power switches of the half-bridges. If this reference potential is Uz+, then it is possible to dispense with the device for potential separation for the control signals of the upper power switches of the half-bridges.

The signal electronics may have a reference potential, which is also the reference potential for the device for current detection. An advantage in this regard is that it is possible to dispense with costly potential-separating devices. For if the devices for current detection are provided in the supply lines to the motor, then costly potential-separating devices would be required.

All devices for current detection may be assignable to a single analog-digital converter via a multiplexer and/or switch. An advantage in this regard is that the converter may be implemented in a cost-effective manner, in particular by dispensing with additional analog-digital converters.

In principle, it would also be possible to assign more than one analog-digital converter to the device for current detection. An advantage in this regard would be that when using suitably disposed multiplexers the respectively selected pair of devices for detecting the currents is assignable to the for example two analog-digital converters and additional sample-hold circuits are dispensable. In particular, respectively one analog-digital converter would be assignable to each device for current detection. An advantage in this regard is that no additional sample-hold circuits are required and a synchronous detection of the current sampling values may be ensured. Preferably, a sample-hold circuit could then also be disposed between each device for current detection and the assignable analog-digital converter. An advantage in this regard would be that the current space vector is determinable without falsification by current ripples and that a single analog-digital converter suffices. Furthermore, the signal electronics may include a microcontroller, which has a single analog-digital converter, and a sample-hold circuit, which is not included in the microcontroller, that is, an additional, external one. An advantage in this regard would be that a cost-effective microcontroller could be used, which includes only one single analog-digital converter.

The signal electronics may include a device for generating pulse-width modulated control signals for the power switches and the signal electronics may have a reference potential that is also the reference potential for the device for current detection. An advantage in this regard is that devices for potential separation are dispensable.

A respective device for current detection is assignable to a single analog-digital converter via a multiplexer and/or switch. Thus costly additional analog-digital converters are then dispensable.

Among features of example embodiments are that devices for detecting the respective currents are situated either in all three lower or in all three upper branches of the half-bridges, the pulse-width modulation frequency is greater than a minimum frequency, within a time period, which amounts to two pulse-width modulation periods, two of the three devices for detecting the currents are used to determine respectively at least one associated current sampling value, and the same average output voltage space vector is output in both pulse-width modulation periods, a first current sampling value is detected at the midpoint of the first of the two pulse-width modulation periods using a first device of the pair and an associated current sampling value is detected at the midpoint of the second, that is, in the immediately subsequent pulse-width modulation period using a second device of the pair, a current space vector is formed or the current values in the output branches are formed from the current sampling values determined by this pair of devices, in particular for use in a control and/or regulation method, and this pair of devices is variously selected as a function of the average output voltage space vector, and the average output voltage space vector being determined by the differences of the output potentials of the three output phases averaged over a pulse-width modulation period.

An advantage in this regard is that a single analog-digital converter suffices even at high pulse-width modulation frequencies and no external sample-hold circuits are required. When the minimum frequency, which amounts to 10 kHz for example, is undershot, a switchover may be performed to the previously described method. Thus the advantages exist even at all pulse-width modulation frequencies.

BRIEF DESCRIPTION OF THE DRAWINGS

FIG. 8 is a table of angular ranges corresponding to different angular ranges of an output voltage vector.

FIG. 9 is a table of angular ranges corresponding to different angular ranges of an output voltage vector.

LIST OF REFERENCE CHARACTERS

Figure 1:
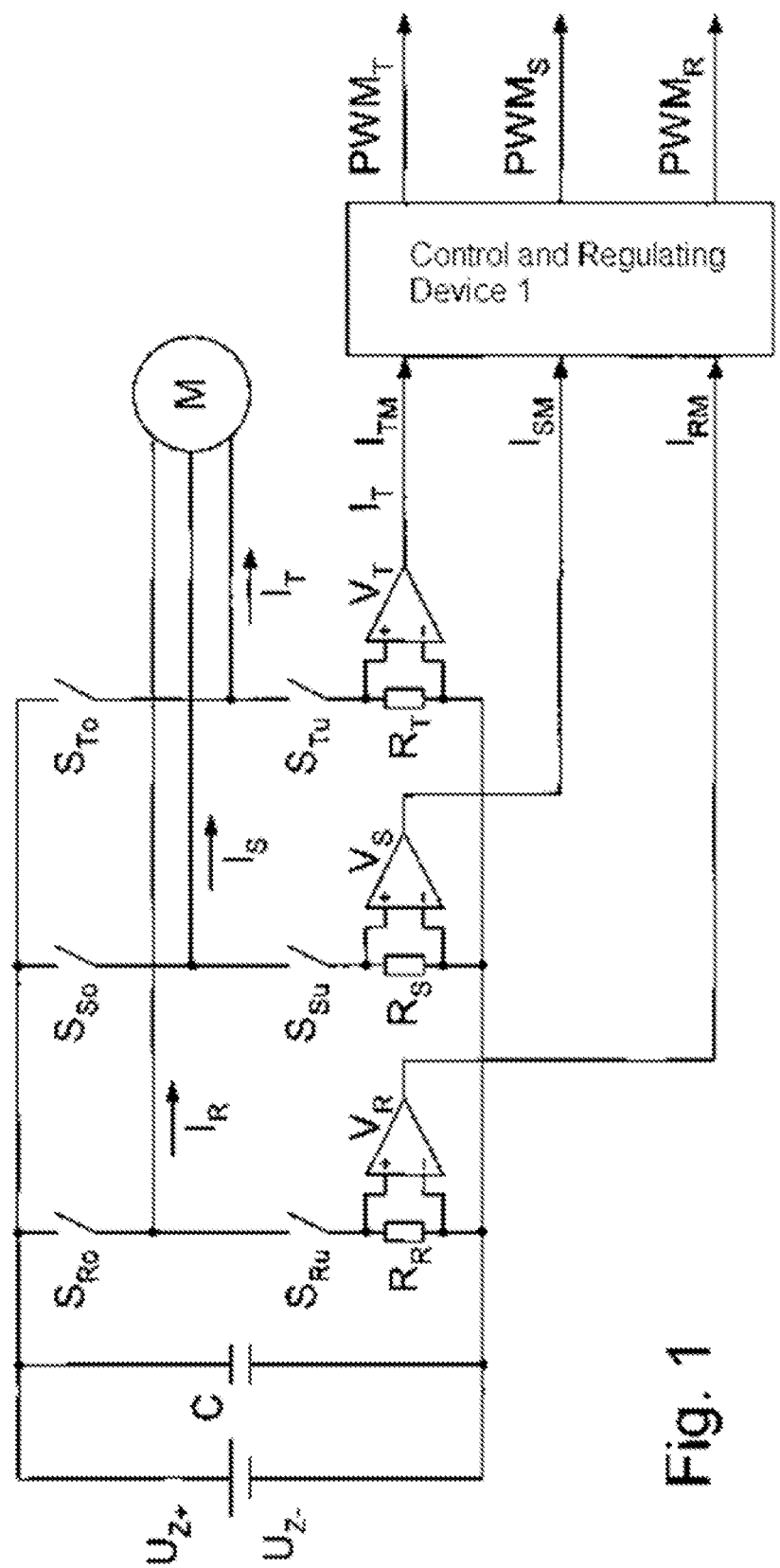
FIG. 1 illustrates a control and regulating device.

1 control and regulating device
21 sample-hold circuit
22 microcontroller
23 multiplexer

DETAILED DESCRIPTION

Example embodiments of the present invention are explained in more detail with reference to the Figures.

The resistors are connected to amplifier circuits $V_R$, $V_S$ and $V_T$, which respectively generate a current measuring signal $I_{RM}$, $I_{SM}$ and $I_{TM}$ on the output side. Each phase in FIGS. 1 and 2 respectively has one amplifier circuit assigned to it, which is represented in the drawing. According to example embodiments of the present invention, however, each of these amplifier circuits is implemented in hardware from two alternatively usable amplifier circuits, which are situated in parallel and have amplifications of different magnitude. Alternatively, each amplifier circuit is also implementable using a switchable amplification.

According to example embodiments of the present invention, the amplifications of the amplifier circuits are selectable. This allows for the entire control electronics of the different exemplary embodiments to be used respectively for different power classes of converters, which have different inverter stages with switches S according to their power class. For this purpose, switches S are designed for maximally admissible currents and/or powers of different magnitude.

Thus if different switches are used for different power classes and thus currents of different magnitude occur, the measuring amplifications are selectable accordingly such that the same shunt resistor or at least shunt resistor value may be used for example. In this manner, only the power component, including the switch of the inverter, has to be adapted to the power class.

The converter may thus be implemented using one circuit board that includes the measuring amplifier circuits of the current detections. This circuit board may thus also be installed in multiple converters that differ in terms of their nominal power and thus have different power stages including corresponding power switches. A great variance within a series may thus be manufactured using a small number of parts.

Using the offset determination described further below and the determination of the amplifications also described further below, a switchover is also made possible in ongoing operation in a simple in quick manner. For if the current measuring value to be expected is small for example, but a higher resolution of the current measuring value is to yield a better control performance, then a switchover is implementable even during the operation and control of the motor without having to expect a jump in the measured current curve, for example due to offsets of different magnitudes, or an amplification of the detected current value varying as a function of the angle, for example due to amplifications of varying magnitudes of the current detections associated with the individual.

From the three current measuring signals as shown in FIG. 1, current sampling values are derived by analog-digital conversion, from which current measuring values are formed.

The current space vector is determined from these current measuring values, the half-bridges associated with the current measuring values being selected as a function of the angle of the voltage space vector. Since according to the Kirchhoff rule, for the motor currents $I_R+I_S+I_T=0$, this current space vector has two degrees of freedom. That is to say, it has two independent parameters. Consequently, it is in principle sufficient to use only current measuring values associated with two branches to determine the current space vector. For this purpose, however, one must take into account that the pulse-width modulation signals of the converter within one pulse-width modulation period do not have to be constant, that is, the switching states change in such a way that switching states may even appear at times, which taken just by themselves would not allow for a determination of the current space vector at all!

For the control method of the converter, it suffices for reaching a sufficient control performance to determine a current space vector once per pulse-width modulation period as an operand, which represents the average value of the physical current space vector formed over one pulse-width modulation period.

The pulse-width modulation signals $PWM_R(t)$, $PWM_S(t)$ and $PWM_T(t)$ generated by control and regulating device 1 determine the state of power switches $S_{Ro}$, $S_{So}$, $S_{To}$, $S_{Ru}$, $S_{Sa}$ and $S_{Tu}$. The pulse-width modulation signals are provided as follows: If the respective pulse-width modulation signal, for example $PWM_R(t)$, is 1, then the associated upper power switch, $S_{Ro}$ for example, is closed and the associated lower power switch, $S_{Ra}$ for example, is opened. In this case, the associated output voltage potential is $U_{z+}$. If the pulse-width modulation signal is 0, that is, it is in the LOW state, then the associated power switches are in the respectively other state and the associated output voltage potential is $U_{z-}$. The so-called dead time inserted in the practical implementation, during which the respective upper and lower switch is open, is not relevant for the fundamental function described herein.

If a pulse-width modulation signal associated with a half-bridge is in the LOW state, then the associated motor current flows in the lower branch of the associated half-bridge and thus across the respective shunt resistor. For the precise detection of the current measuring values, the associated motor current must flow through the shunt resistor for longer than a minimum duration. The minimum duration is a function of the filter effect of the measuring amplifier circuits, including amplifier circuits $V_R$, $V_S$ and $V_T$. A filter effect is achieved by appropriate circuitry in order to suppress noise components or interference components in the current measuring values. For example, at a pulse-width modulation frequency of 16 kHz, a filter time constant from the range of 0.5 µs to 2 µs is advantageous.

Advantageously, a so-called symmetrical pulse-width modulation method is used in the exemplary embodiment. In such symmetrical pulse-width modulation methods, the time average that is formed from the value of the time of a first switching state change of the pulse-width modulation signal in a first phase and the value of the time of the subsequent associated switching state change in the same phase has the same value as the correspondingly formed average values of the other two phases. Hence, the switching state changes from HIGH to LOW and back in all three phases are symmetrical with respect to the midpoint of the pulse-width modulation period.

Advantageously, in an exemplary embodiment, the amplitude of the averaged output voltage space vector is limited to $U_z/\sqrt{3}$ such that a sinusoidal three-phase voltage system is always generatable. This limitation indicates the maximum modulation amplitude. An overmodulation, that is, a departure from this operating range defined by the limitation, is always avoided.

Advantageously, the exemplary embodiment thus relates only to such converters as are operated in a pulse-width modulated manner such that in no pulse-width modulation period a modulation amplitude is produced that is so high that only a single active switching state occurs for a full pulse-width modulation period. In such an active switching state, the pulse-width modulation signals $PWM_R(t)$, $PWM_S(t)$ and $PWM_T(t)$ assume the values (110), (101), (100), (001), (010) or (011), which are also called active output voltage space vectors. Active switching states thus do not include the switching states (111) and (000). The two latter switching states are also called the discrete zero voltage space vector or zero vector.

So-called marginal vectors are those, over a pulse-width modulation period averaged output voltage space vector, which would result in the theoretical application of a single of the active switching states over an entire pulse-width modulation period. Advantageously, in an exemplary embodiment, the output voltage space vector averaged over one pulse-width modulation period, never takes on the value of such a marginal vector because of the above-mentioned limitation of the operating range.

In terms of the representation of the mentioned IEEE document by Francesco Parasiliti, according to FIG. 8 on page 1287, the above-described limitation of the output voltage space vector averaged over a pulse-width modulation period means that the latter falls within the maximum incircle of the hexagon. The averaged output voltage space vector never assumes the value of a marginal vector, that is, in the exemplary embodiment it never comes to lie in the corners of the hexagon.

Since the output voltage space vector is limited, various discrete switching states alternate. By a skillful selection of the times for the measuring impulses within a pulse-width modulation period, a current space vector may be determined for each pulse-width modulation period. The alternating states even include states in which the determination of a current space vector would not be possible if they were applied permanently over a pulse-width modulation period, as for example also the state (101) according to the last row of Table 2B from U.S. Pat. No. 5,815,391. In particular, for example, a measuring impulse is implemented at a first time in a first phase, a second measuring impulse is implemented at another, second time in a second phase, and a third measuring impulse is implemented at a third time in the first phase. The averaging of the first and third measuring values ensures that the ascertainable current space vector is not falsified by current ripples in the pulse-width modulation method admissible for the exemplary embodiment, in particular symmetrical pulse-width modulation methods, in which the output voltage space vector is limited to the incircle of the hexagon. Thus only a single analog-digital converter is required, in particular without external additional sample-hold circuits.

Figure 2:
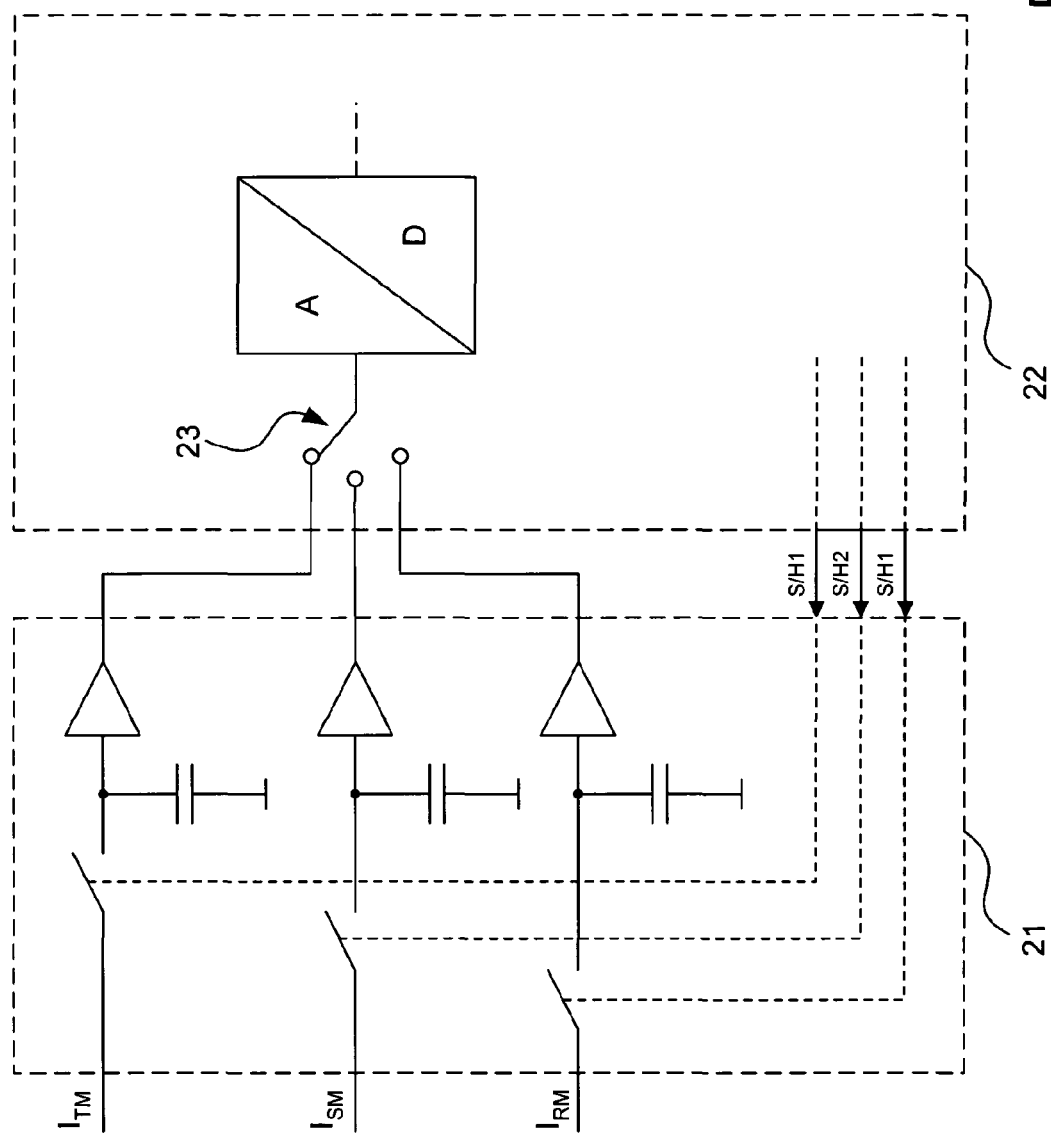
FIG. 2 illustrates an implementable variant for a part of the control and regulating device illustrated in FIG. 1.

FIG. 2 shows an implementable variant for a part of control and regulating device 1 from FIG. 1. It includes a sample-hold circuit 21, which is supplied with the three current measuring signals, and a microcontroller 22 having an integrated analog-digital converter. Via signals S/H1, S/H2 and S/H3, microcontroller 22 controls the sampling times, which are also referred to as measuring impulses, at which the sample-hold circuit 21 holds current measuring signals until the analog-digital conversion. Microcontroller 22 then only has to include one single analog-digital converter together with an analog multiplexer or changeover switch 23. The advantage in this regard is that using only one single analog-digital converter a simultaneous detection of current sampling values is achieved even though a sequential analog-digital conversion is performed. In microcontroller 22, current measuring values or a current space vector are then determined from the current sampling values. Via signals S/H1, S/H2 and S/H3, microcontroller 22 controls the sample-hold circuit and thus the measuring impulses in accordance with the methods described further below.

Figure 3:
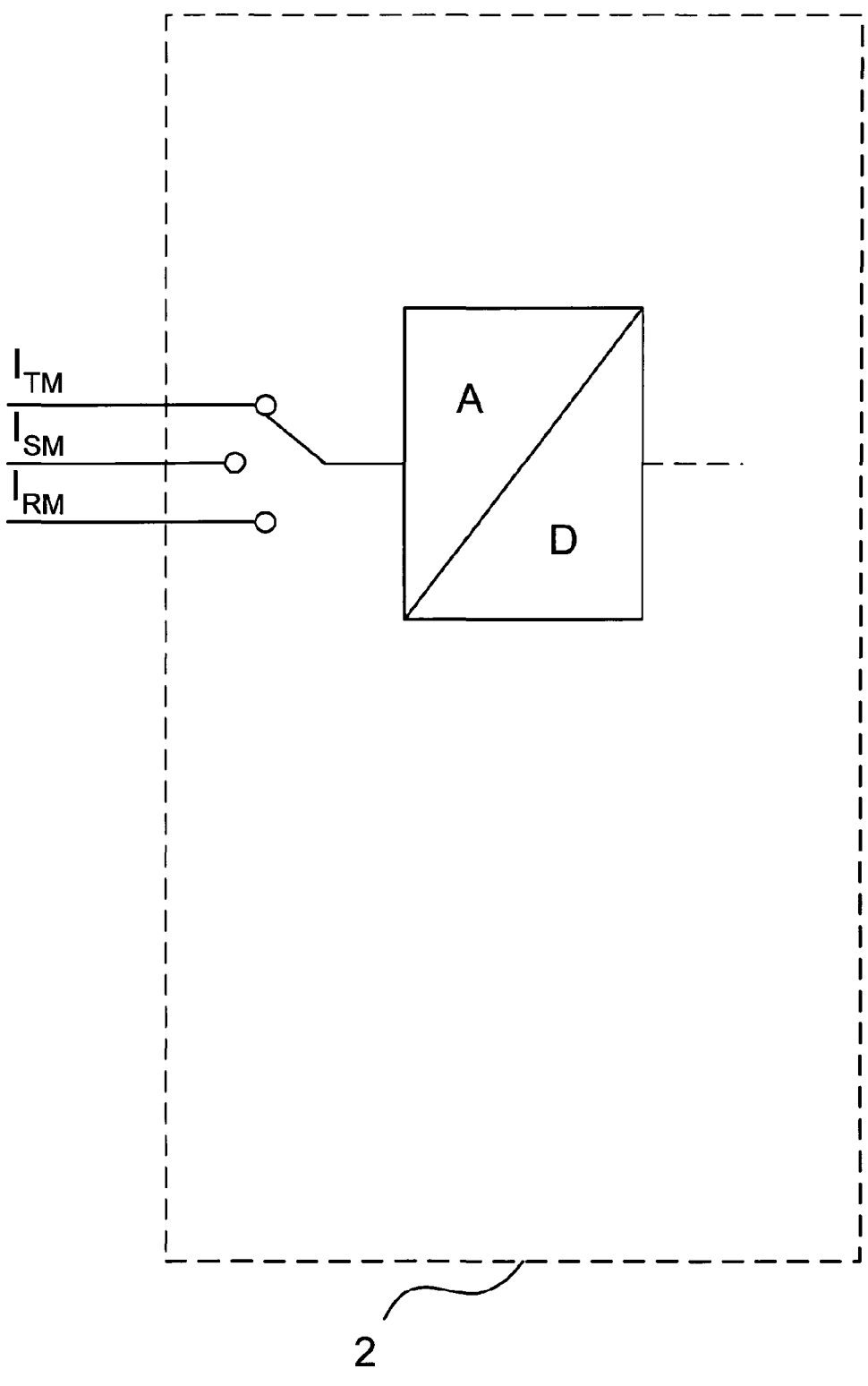
FIG. 3 illustrates another variant for a part of the control and regulating device illustrated in FIG. 1.

In another exemplary embodiment, as shown in FIG. 3, in contrast to the variant according to FIG. 2, sample-hold circuit 21 is dispensable. For this purpose, it is necessary, however, to detect the current sampling values successively in accordance with the methods described further below.

Figure 4:
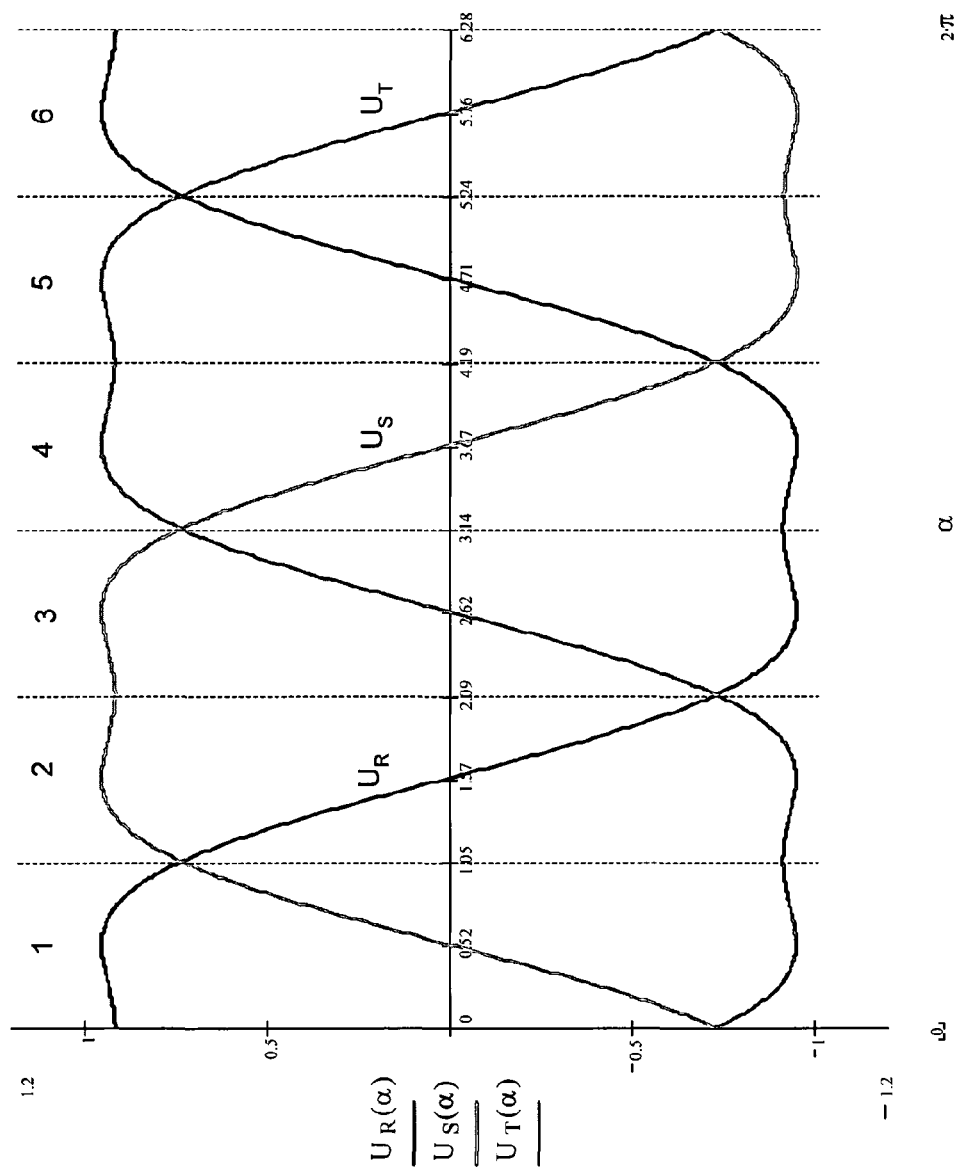
FIG. 4 illustrates an exemplary time characteristics of motor-side output potentials, averaged respectively over one pulse-width modulation period, of a converter over one output voltage period.

FIG. 4 shows exemplary time characteristics of the motor-side output potentials $U_R$, $U_S$ and $U_T$, averaged respectively over one pulse-width modulation period, of the converter over one output voltage period, the motor-side output potentials $U_R$, $U_S$ and $U_T$ being drawn in normalized and the output voltage angle α extending over the range from 0 to 2π. In accordance with the normalization, the potential value $U_{Z-}$ corresponds to the value −1 and $U_{Z+}$ to the value +1.

FIG. 4 shows that the average values of the output potentials contain a third harmonic component.

FIG. 4 further shows angle ranges 1 through 6 of the output voltage vector, in which various means for current detection are used.

At an output voltage angle of α=π/6, the average value of the output potential $U_S$ is zero. The average value of output potential $U_R$ is in the proximity of the positive maximum value 1. The average value of output potential $U_T$ is in the proximity of the minimum value −1. At this output voltage angle and at the amplitude chosen in exemplary fashion, the average values of the output potentials thus almost reach the maximum modulation amplitude of the converter.

Figure 5:
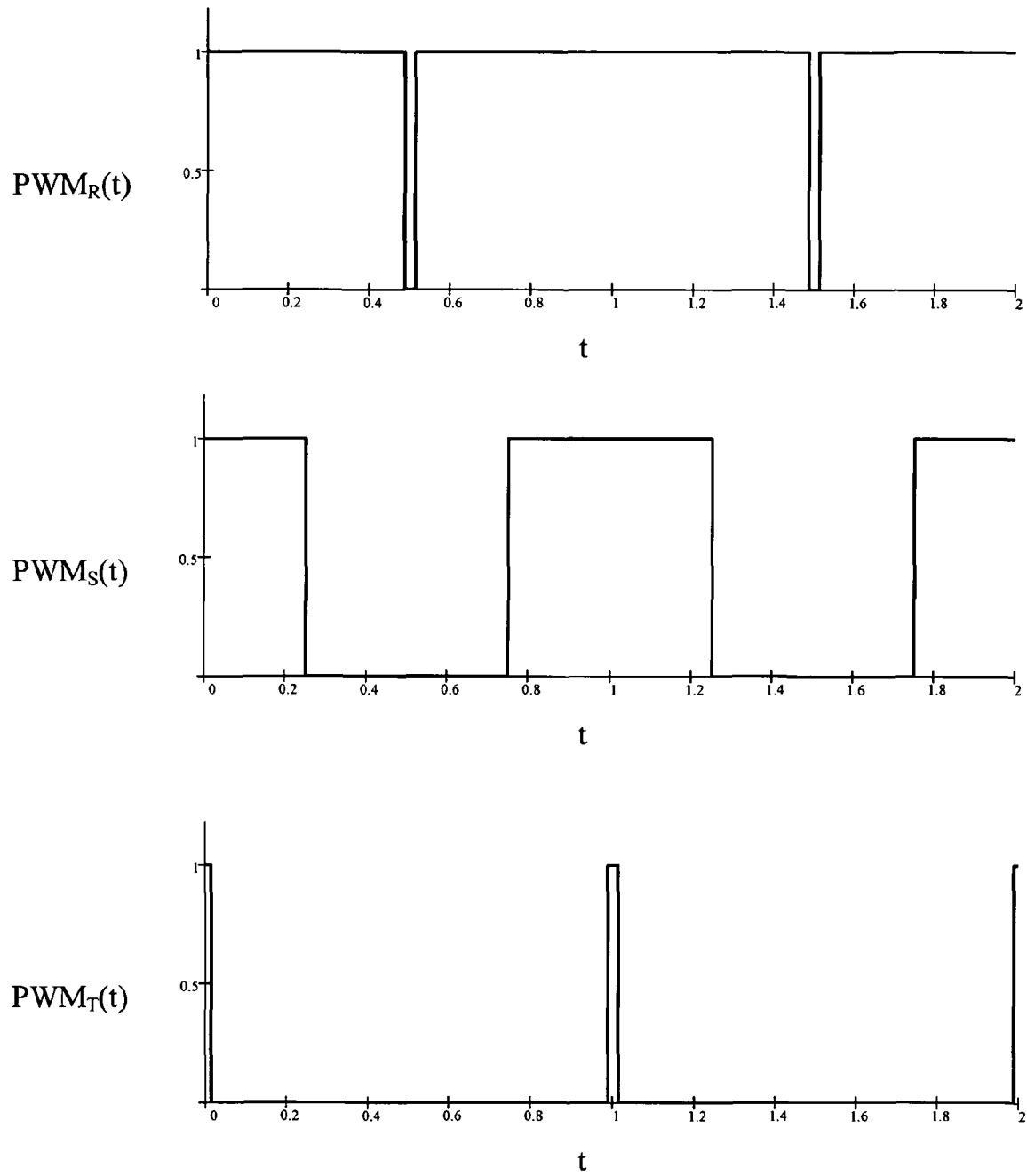
FIG. 5 illustrates associated time characteristics of pulse-width modulation signals.

For the output potentials from FIG. 4, again at output angle α=π/6, FIG. 5 shows associated time characteristics of pulse-width modulation signals $PWM_R(t)$, $PWM_S(t)$ and $PWM_T(t)$. From these the control signals for the power switches $S_{Ro}$, $S_{So}$, $S_{To}$, $S_{Ru}$, $S_{Su}$ and $S_{Tu}$ are derived. If the respective pulse-width modulation signal, for example $PWM_R(t)$, is 1, then the associated upper power switch, $S_{Ro}$ for example, is closed and the associated lower power switch, $S_{Ru}$ for example, is opened. In this case, the associated output voltage potential is $U_R=U_{Z+}$. If the pulse-width modulation signal is 0, then the associated power switches enter into the respectively other state and the associated output voltage potential is $U_{Z-}$. The so-called dead time inserted in the practical implementation, during which the respective upper and lower switch is open, is fundamentally not relevant for the functioning of the exemplary embodiment. FIG. 5 shows two pulse-width modulation periods in the direction of the abscissa.

According to FIG. 5, the output voltage potential $U_S=0$ averaged over one pulse-width modulation period is reached by a $PWM_S(t)$ signal, which is at 50% of pulse-width modulation period 1 and at 50% of pulse-width modulation period 0. The pulse-width modulation ratios of the other pulse-width modulation signals $PWM_R(t)$ and $PWM_T(t)$ are distributed according to their output voltage potential averaged over one pulse-width modulation period.

Figure 6:
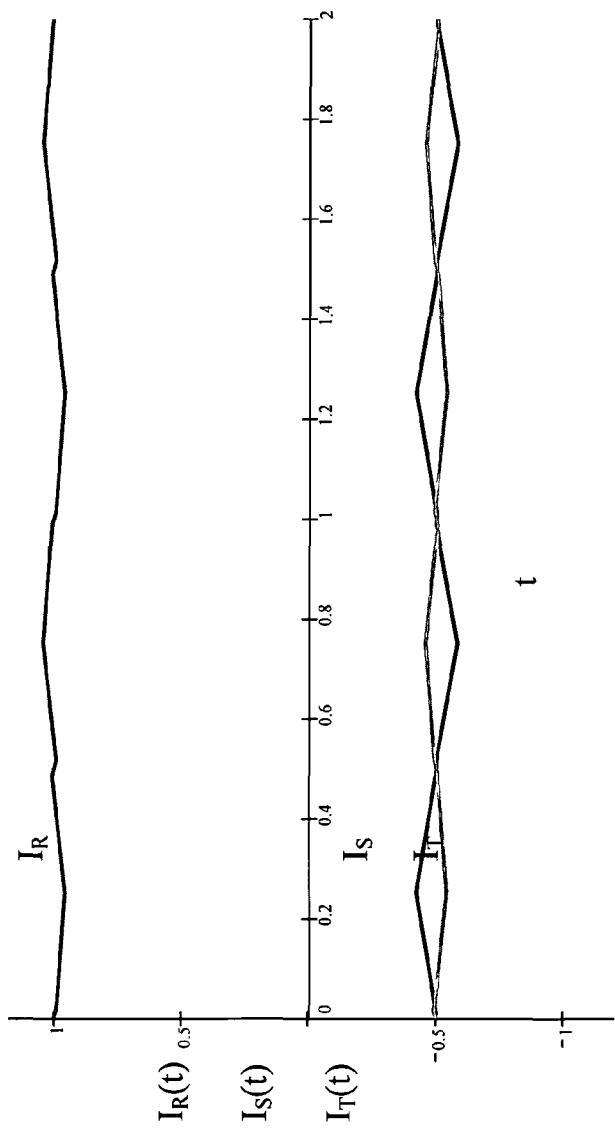
FIG. 6 illustrates exemplary motor currents in output branches associated with pulse-width modulation periods.

FIG. 6 shows the exemplary motor currents $I_R(t)$, $I_S(t)$ and $I_T(t)$ in the output branches associated with the two mentioned pulse-width modulation periods. Furthermore, the current ripple resulting from the pulse-width modulated output potentials is indicated.

Figure 7:
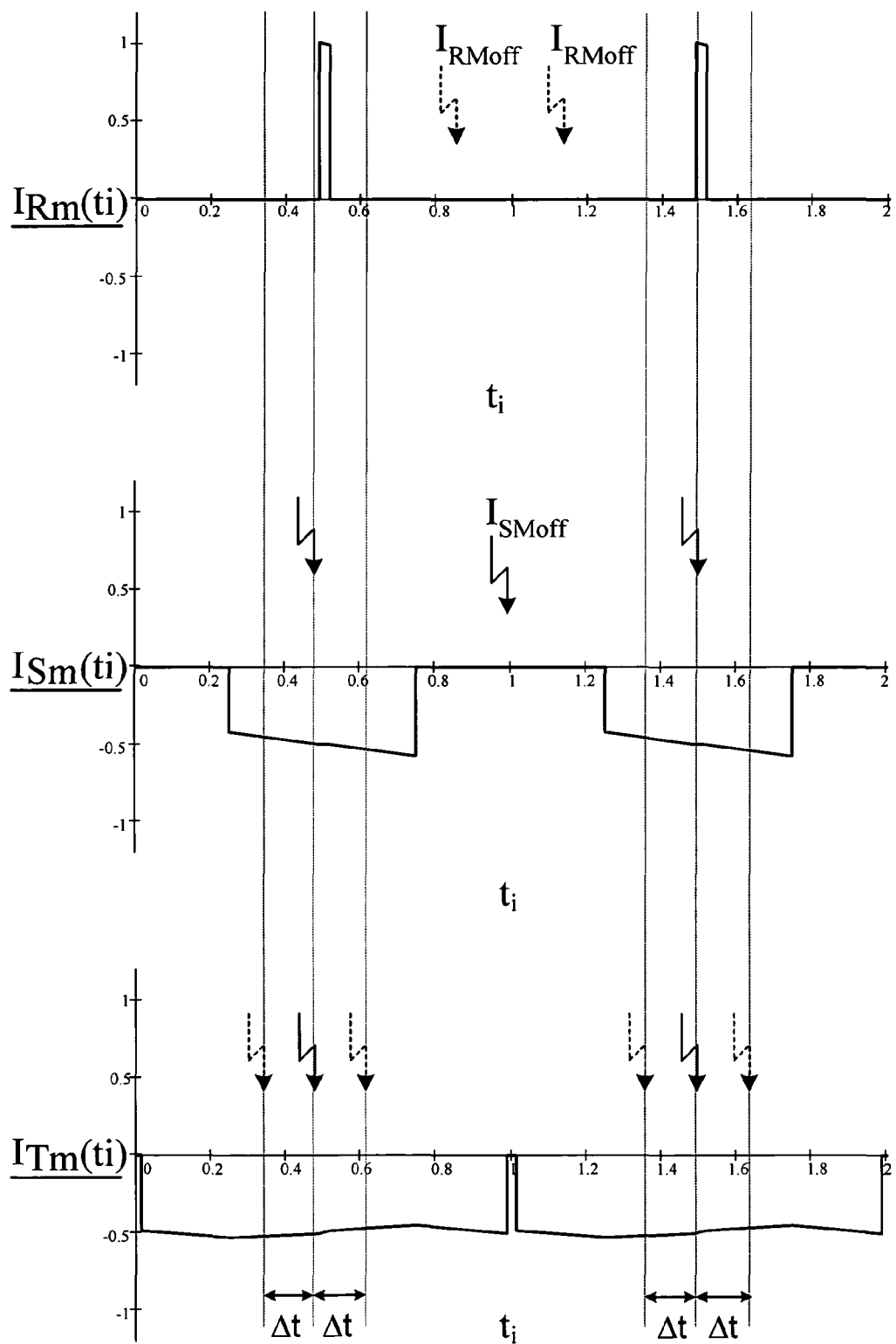
FIG. 7 illustrates idealized time characteristics of current measurement signals associated with pulse-width modulation periods, without filtering effects of amplifier circuits.

FIG. 7 shows the idealized time characteristic of current measurement signals $I_{RM}(t)$, $I_{SM}(t)$ and $I_{TM}(t)$ associated with the two mentioned pulse-width modulation periods, without the filtering effect of amplifier circuits $V_R$, $V_S$ and $V_T$. A current sampling value deviating from zero always occurs only at those time periods in which the pulse-width modulation signal of the associated half-bridge is zero, i.e., the lower switch is closed. For if the upper switch is closed the motor current does not flow over the shunt resistor of the half bridge such that during this time the current measuring signal is zero independently of the actual current. The current measuring signals thus do not represent the motor currents continuously, but they represent these only in those time periods in which the pulse-width modulation signals $PWM_R(t)$, $PWM_S(t)$ and $PWM_T(t)$ are zero. In the shown curve, the current measuring signal $I_{RM}(t)$ differs from zero only for a very short time period. At the maximum modulation amplitude of the output voltage, this time period would even disappear entirely. From FIG. 7 it may be seen therefore that the determination of a current space vector fails in operating states in which the current space vector is formed using current measuring signals that differ from zero only for such a short time, as $I_{RM}(t)$ in FIG. 7 for example, that they are significantly falsified by the filter effect at the time of detection, that is, in the measuring impulse. A minimum filter effect is necessary, however, to suppress measuring noise and interference signals.

Hence, in an exemplary embodiment, for each pulse-width modulation period, the "optimal" pair, which has the respectively wider pulse-width modulation signals, is selected from the three half-bridges, i.e. only current measuring signals of these two special half-bridges are used. The selection is performed so as not to use the current measuring signal, the lower switch of which has the closed state for a shorter period than the two other lower switches within a respective pulse-width modulation period.

FIG. 7 shows an operating state for two pulse-width modulation periods, in which the selected pair is $I_{SM}(t)$ and $I_{TM}(t)$. For these, the times at which the current sampling values are detected and which are also called measuring impulses are indicated by jagged arrows.

Two basic types of methods may be utilized for this purpose.

For a first method, the measuring impulses are drawn in by continuous, not dashed, jagged arrows. In the selected pair $I_{SM}(t)$ and $I_{TM}(t)$ the current sampling values are detected simultaneously. For this purpose, various implementations may be provided. In a first implementation, each current sampling value is formed by a separate analog-digital converter. In a second implementation, the three current measuring signals shown in FIG. 2 are respectively supplied to a sample-hold amplifier of sample-hold circuit 21, the sample-hold amplifiers changing into the hold state at the time of sampling. Using the multiplexer or changeover switch, the analog-digital converter is thus able to convert the held current measuring signals successively. In a third implementation, two analog-digital converters and corresponding changeover switches are used. In additional implementations, mixed forms are implementable as well.

In the first method, a symmetrical pulse-width modulation method is preferably used, the switching frequency being selected to be no higher than 20 kHz and the above-described maximum modulation amplitude not being exceeded. Thus, within a pulse-width modulation period, there is always a pulse pattern, in which in at most one output branch a pulse-width modulation signal occurs, the LOW state of which is shorter than the minimum duration. That is to say, both pulse-width modulation signals are never in the LOW state in two phases simultaneously for less than the minimum duration. In the event that the LOW state of one of the pulse-width modulation signals, for example $PWM_R(t)$, falls below the minimum duration, it is ensured nevertheless that the current space vector is determined correctly. For the two other pulse-width modulation signals, that is, $PWM_S(t)$ and $PWM_T(t)$ in the example, do not fall below the minimum duration. Thus, in an exemplary embodiment, a correct determination of the current space vector is always ensured to the extent that it is ensured in the respective type of pulse-width modulation methods that always at most one pulse-width modulation signal remains less than the minimum duration in the LOW state.

In a second method, the measuring impulse at the midpoint of the pulse-width modulation period for $I_{TM}$ of the first method is replaced by two measuring impulses, which respectively have a time offset $\Delta t$. In a sequential manner, first the first measuring impulse occurs for $I_{TM}$, then the one for $I_{SM}$ and then the second measuring impulse for $I_{TM}$. An advantage in this regard is to set the measuring impulse for $I_{SM}$ at the midpoint of the pulse-width modulation period. The time offset $\Delta t$ is to be selected as small as possible, but greater than the analog-digital converter time. The average is formed from the first and second current sampling value for $I_{TM}$ and is used for determining the current space vector. This average value thus formed corresponds to the fictitious current sampling value for $I_{TM}$, which would be detectable at the same time for detecting current sampling value $I_{SM}$. The current space vector determined in this manner is thus free from the influence of the current ripple. For when using symmetrical pulse-width modulation methods, the current ripple also has a characteristic curve, centrosymmetric to the midpoint of the pulse-width modulation period, to the respective current functional value at t=0.5, as FIG. 6 also shows in exemplary fashion. In FIG. 6, the midpoint of the first pulse-width modulation period is at t=0.5 and of the second pulse-width modulation period at t=1.5. Since therefore the two current sampling values $I_{TM}(t=0.5-\Delta t)$ and $I_{TM}(t=0.5+\Delta t)$ are centrosymmetric to current functional value $I_{TM}(t=0.5)$, the average value of the two current sampling values $I_{TM}(t=0.5-\Delta t)$ and $I_{TM}(t=0.5+\Delta t)$ equals the current functional value $I_{TM}(t=0.5)$.

In this manner it becomes possible to determine the current space vector without falsification by current ripples using only one single analog-digital converter. For since all current samplings are able to be carried out sequentially, additional sample-hold circuits are also dispensable. The additional sample-hold circuits are not to be understood as the sample-hold circuits that are a fixed component in customary analog-digital converters.

In the second method as well, a symmetrical pulse-width modulation method is preferably used, the switching frequency being advantageously selected to be no higher than 20 kHz and the above-described maximum modulation amplitude not being exceeded. Thus, again, within a pulse-width modulation period, there is always a pulse pattern, in which in at most one output branch a pulse-width modulation signal occurs, the LOW state of which is shorter than the minimum duration. In the pulse-width modulation method used in the second method there always exists at least one pulse-width modulation signal, the LOW state of which lasts longer than the sum of the minimum duration and twice the value of the time offset, that is, 2*Δt. Thus in an exemplary embodiment, a correct determination of the current space vector is always guaranteed if it is ensured in the respective type of the pulse-width modulation methods that the pulse-width modulation signals have a sufficient pulse width. Although flat top methods are generally symmetrical pulse-width modulation methods, they are not advantageously utilizable in the case of small output voltages.

Furthermore, in the exemplary embodiment shown in FIG. 7, one or more current sampling values are detected in those time periods in which a vanishing current sampling value is to be expected. FIG. 7 shows in exemplary fashion that for phase R the measuring value $I_{RMoff}$ is detected at two points in time, the average of the two detected measuring values being used for this purpose, and for phase S the measuring value $I_{SMoff}$. In phase T, the time period for an interference-free detection of a current measuring value is too short and therefore no current is detected in those time periods in which a vanishing current sampling value is to be expected.

If in subsequent pulse-width modulation periods the voltage values to be generated in the individual phases change and thus in phase T a longer time period for vanishing current to be expected, a current sampling value is also detected in phase T. In particular, in a rotating field to be generated the current detection is thus evenly distributed over the three phases.

In this manner, the offset of the individual measuring amplifiers of the sample-hold circuit is determinable. It is taken into account in the current detection in that the respectively active offset value is subtracted from the detected measuring value. Thus an improved measuring value is obtained and therefore also an accordingly improved motor control. Advantageously, this offset determination is made possible online, that is, during the ongoing operation of the control system. In the process, only additional detections of the current are carried out that cause no substantial additional load on the control unit or a slowdown of the control and regulating method. Another advantage is that the drift of the offset caused by a temperature rise becomes determinable and may be counteracted accordingly.

The time of the current sampling has an interval of at least a 6 μs, preferably at least 8 μs, from that of the preceding time period in which the associated bridge branch was switched on. This ensures that oscillation processes have terminated and that the current has reliably faded.

In another exemplary embodiment, instead of the two measurements in phase R only one single measuring value is detected, which is not detected simultaneously with the measuring value of phase S.

In a further development, a floating average of some most recently detected measuring values is used as the currently detected offset value.

Preferably, the measuring values are detected symmetrically around the first sampling time.

In the exemplary embodiment, only those pulse-width modulation methods are used, which have a switching state at the midpoint of the pulse-width modulation period such that at least two lower switches are closed.

In another exemplary embodiment, the current sampling values are not determined in the same pulse-width modulation period, but rather the first current sampling value is detected in a first pulse-width modulation period and the second current sampling value is detected in one of the subsequent pulse-width modulation periods. In this instance it is again possible to provide only a single analog-digital converter without an additional sample-hold circuit. This is particularly advantageous at a high switching frequency and thus short pulse-width modulation periods. In this instance there is no falsification by current ripples. Only the change of the angle of the current space vector occurring during this time can become a cause of falsifications. The pair is selected as shown in FIG. 8.

FIG. 4 shows angular ranges 1 through 6, which correspond to different angular ranges of the output voltage vector. In FIG. 8, for each of these angular ranges, the pair to be used is indicated by jagged arrows. For example, in angular range 1, only S and T, that is, $I_{SM}$ and $I_{TM}$, are to be used. In angular range 2, only R and T, that is, $I_{RM}$ and $I_{TM}$, are to be used. In those angular ranges, in which no current detection is performed in a respective phase, the detection of the offset value is provided. In FIG. 8, this is indicated by the entry $I_{RMoff}$, $I_{SMoff}$ and $I_{TMoff}$.

According to FIGS. 1 and 2, a respective means for current detection is assigned to each bridge branch associated with a respective phase R, S, T. As indicated in the figures, this includes a respective measuring amplifier. According to example embodiment of the present invention, at the beginning or in another time period, the measuring amplification of the three devices associated with the three phases is determined and/or adapted at least to one another.

For this purpose, in a first step, a first of the three bridge branches is switched off and the two others have current applied to them such that in the bridge branch associated with a second phase the same current in terms of absolute value flows as in that of the third associated phase. Afterwards, a current sampling value is detected in both phases.

Preferably, in a second step, the applied voltage is subsequently changed in polarity, that is, the direction of the current is inverted, the same duration of the application of current being provided as in the first step such that the associated current-time area in the first and the second step is substantially of the same size. In this manner, a possible torque-producing effect is prevented at least on average over time. After the build-up of the current in the second time step, corresponding current sampling values are again detected for both phases.

The first and second steps are repeated, the devices associated with the phases being switched cyclically.

In this manner, the three amplifications of the current detections associated with the three phases, including respective measuring amplifiers, are determined. Preferably, this determination is preceded by a determination of the offset value using a detection of a current sampling value when the bridge circuits are respectively switched off.

After the determination of the three measuring amplifications, the current detection may be performed in all three phases in normalized fashion, that is, the current sampling value divided by the measuring amplification may be utilized for the control method of the converter. A current space vector that is constant in terms of its absolute value, but changing in terms of its angle is thus also detected as a current that is constant in terms of its absolute value and the control achieves improved control properties, in particular a higher control performance. In particular, the torque determined from these current measuring values is determined more precisely and realistically.

Moreover, in determinations of the measuring amplifications performed repeatedly at time intervals, a drift of the measuring amplifications may be compensated and taken into account.

As described above, in the second method, the measuring impulse occurring symmetrically at the midpoint of the pulse-width modulation period for a current sampling value of the first method is replaced by two measuring impulses, which respectively have a time offset Δt. FIG. 9 shows how the measuring impulses are to be carried out as a function of the angular ranges of the output voltage space vector. The figure shows in particular in which half-bridge two measuring impulses are to be carried out and in which half-bridge the single centrally positioned measuring impulse is to be carried out. Thus, in angular range 1, a first measuring impulse occurs for $I_{TM}$, then a single, centrally located measuring impulse for $I_{SM}$ and finally a second measuring impulse for $I_{TM}$. The measuring impulses have a time interval of Δt.

Thus, in angular range 3, a first measuring impulse occurs for $I_{RM}$, then a single, centrally located measuring impulse for $I_{TM}$ and finally a second measuring impulse for $I_{RM}$.

For each angular range, there is thus a phase having a solidly drawn jagged arrow, which indicates a centrally occurring current sampling in this phase, and another phase having two dashed jagged arrows, which indicates a dual current sampling in this phase, that is, by time offset Δt prior to and following the midpoint. In an exemplary embodiment, only those pulse-width modulation methods are used, the pulse patterns of which are always characterized in such a way that the lower switches in the respective angular range of the phases indicated by jagged arrows are closed in a time range around the respective current samplings. In the phase featuring two dashed jagged arrows, the associated lower switch is closed from prior to the first measuring impulse until after the second measuring impulse.

The characteristic of the utilizable pulse-width modulation methods is that at least at the time of the midpoint of the pulse-width modulation period two lower switches are always closed, the switch of these two lower switches that is associated with the phase having the dual current sampling even remaining closed at least for at least a time span of 2Δt.

Again, in those angular ranges in which no current detection is performed in a respective phase, the detection of the offset value is provided. In FIG. 9, this is indicated by the entry $I_{RMoff}$, $I_{SMoff}$ and $I_{TMoff}$. Thus, the otherwise unused ranges are utilized for the determination of the offset value of the current detection, that is, of the entire means for this purpose such as measuring amplifier, multiplexer and analog/digital converter.

In other exemplary embodiments, according to FIG. 7, the two current sampling values of current measuring signal $I_{TM}$ are not detected symmetrically around the measuring impulse for detecting the current sampling value of current measuring signal $I_{SM}$, that is, not at time interval Δt prior to and after the detection of $I_{SM}$, but rather at different time intervals. Then, instead of the average value, an interpolated value is formed, which takes into account the corresponding time intervals, it being necessary for this purpose, however, to take into account variables characterizing the motor and also the type and duration of the switching states in the interpolation.

In other exemplary embodiments, instead of the mentioned two current sampling values, more current sampling values are detected. In addition, fundamentally any current sampling value is replaceable by multiple current sampling values. Thus it is possible to provide for a further reduction of measuring noise.

In additional exemplary embodiments, the time response of amplifier circuits $V_R$, $V_S$ and $V_T$ is taken into account in that all measuring impulses occur delayed by the filter time constant of the amplifier circuits. The filter time constant is in this instance smaller than half the minimum duration.

The method also functions at pulse-width modulation frequencies higher than 20 kHz.

The invention claimed is:

1. A circuit board for a converter, including control electronics, comprising:
   at least one current detection device, each current detection device including a measuring amplifier circuit switchable to at least two measuring amplifications, a control line being provided from the control electronics to the measuring amplifier circuit to control a switchover;
   wherein power switches situated in three half-bridges having respectively one lower and one upper branch, such that the current detection devices are situated either in all three lower or in all three upper branches of the half-bridges; and
   wherein a current space vector is determined from a detected current value, the three half-bridges associated with the detected current value being selected as a function of an angle of a voltage space vector; and
   wherein an operation of the measuring amplifier circuit is selectively modifiable in order to switch from a first of the at least two measuring amplifications to a second of the at least two measuring amplifications, the first and second measuring amplifications having different absolute values of magnitude, wherein the first and second measuring amplifications are associated with a same phase.

2. A system for determining a current space vector, comprising:
   a converter operable in a pulse-width modulated manner;
   signal electronics;
   a power output stage having power switches situated in three half-bridges having respectively one lower and one upper branch;
   at least one sampling device adapted to sample respective currents situated in the three upper or lower branches of the half-bridge, such that the sampling device is situated either in all three lower or in all three upper branches of the half-bridges;
   wherein an operation of the sampling device is selectively modifiable to switch between a first amplification to a second amplification, the first and second amplifications having different absolute values of magnitude, wherein the first and second amplifications are associated with a same phase; and
   wherein the current space vector is determined from a detected current value, the three half-bridges associated with the detected current value being selected as a function of an angle of a voltage space vector.

3. The system according to claim 2, wherein the system is adapted to perform at least one of (a) a control method and (b) a regulation method.

4. The system according to claim 2, wherein the sampling device includes an amplifier circuit, an amplification of the amplification circuit being adjustable to different values.

5. The system according to claim 2, wherein the sampling device includes two selectively operable amplifier circuits having different amplifications.

6. The system according to claim 4, wherein the amplification is switchable over during execution of at least one of (a) a control method and (b) a regulating method to achieve a better resolution in current detection.

7. The system according to claim 2, wherein the same sampling device is adapted for use in different power switches.

8. The system according to claim 2, wherein the system is adapted to modify an amplification of current detections associated with a respective phase, to determine at least one of (a) an offset and (b) an amplification of the current detection associated with the respective phase, to apply and determine a current, and to determine an amplification in the respective bridge branch.

9. A converter, comprising:
signal electronics;
a power output stage having power switches situated in three half-bridges having respectively one lower and one upper branch; and
at least one sampling device adapted to sample respective currents situated in the three upper or lower branches of the half-bridge;
wherein an operation of the sampling device is modifiable as a function of a state of a selection device to switch from a first amplification to a second amplification having an absolute value of magnitude different than that of the first amplification, wherein the first and second amplifications are associated with a same phase;
wherein the at least one sampling device is situated either in all three lower or in all three upper branches of the half-bridges; and
wherein a current space vector is determined from a detected current value, the three half-bridges associated with the detected current value being selected as a function of an angle of a voltage space vector.

10. The converter according to claim 9, wherein the converter is operable in a pulse-width modulated manner.

11. The converter according to claim 9, wherein each sampling device includes at least two amplifier circuits, only one being operated respectively.

12. The converter according to claim 9, wherein the selection device includes at least one of (a) selector switch, (b) a hardware device, and (c) a parameter value.

13. The converter according to claim 9, wherein, to determine measurement amplifications, a current of identical magnitude is applied to each phase and then determined, and from this the measuring amplification associated with the respective phase is determinable.

14. A converter, comprising:
signal electronics;
a power output stage having power switches situated in three half-bridges having respectively one lower and one upper branch; and
at least one sampling device adapted to sample respective currents situated in the three upper or lower branches of the half-bridge;
wherein an operation of the sampling device is modifiable as a function of a state of a selection device to switch from a first amplification to a second amplification having an absolute value of magnitude different than that of the first amplification, wherein the first and second amplifications are associated with a same phase;
wherein the at least one sampling device is situated either in all three lower or in all three upper branches of the half-bridges;
wherein a current space vector is determined from a detected current value, the three half-bridges associated with the detected current value being selected as a function of an angle of a voltage space vector; and
wherein, to determine an offset of current detection associated with a respective phase, the current is detectable in a bridge branch that is switched off prior to determining a respective measuring amplification.

15. A series of converters, comprising:
at least a first variant and a second variant of converters, the variants differing;
wherein, in all variants, an identical circuit board is provided, which includes at least measuring amplifier circuits for current detection, two measuring amplifier circuits being assigned to each current detection, an amplification of a first measuring amplifier circuit having an absolute value of magnitude different than that of an amplification of a second amplifier circuit, only an output of one of the measuring amplifier circuits being supplied as a detected current value to control electronics of a converter, wherein the amplifications of the first and second measuring amplification circuits are associated with a same phase; and
wherein power switches are situated in three half-bridges having respectively one lower and one upper branch, such that the current detection is situated either in all three lower or in all three upper branches of the half-bridges; and
wherein a current space vector is determined from the detected current value, the three half-bridges associated with the current measuring value being selected as a function of an angle of a voltage space vector.

16. A series of converters, comprising:
at least a first variant and a second variant of converters, the variants differing at least in a maximally admissible nominal power;
wherein, in all variants, an identical circuit board is provided, which includes at least measuring amplifier circuits for current detection, a measuring amplifier circuit switchable to at least two measuring amplifications being assigned to each current detection, a supply line being provided from control electronics to the measuring
amplifier circuit to control a switchover; and
wherein power switches are situated in three half-bridges having respectively one lower and one upper branch, such that the current detection is situated either in all three lower or in all three upper branches of the half-bridges; and
wherein a current space vector is determined from the detected current value, the three half-bridges associated with the detected current value being selected as a function of an angle of a voltage space vector; and
wherein an operation of the measuring amplifier circuit is modifiable to switch from a first of the at least two measuring amplifications to a second of the at least two measuring amplifications that has an absolute value of magnitude different than that of the first of the at least two measuring amplifications, wherein the first and second measuring amplifications are associated with a same phase.

17. A system for determining a current space vector, comprising:
- a converter operable in a pulse-width modulated manner; signal electronics;
- a power output stage having power switches situated in three half-bridges having respectively one lower and one upper branch;
- at least one sampling device adapted to sample respective currents situated in the three upper or lower branches of the half-bridge, such that the sampling device is situated either in all three lower or in all three upper branches of the half-bridges;
- wherein an operation of the sampling device is selectively modifiable to switch between a first amplification to a second amplification, the first and second amplifications having different absolute values of magnitude, wherein the first and second amplifications are associated with a same phase; and
- wherein the current space vector is determined from a detected current value, the three half-bridges associated with the detected current value being selected as a function of an angle of a voltage space vector; and
- wherein the converter is adapted to determine the current space vector once per pulse-width modulation period as an operand, which represents the average value of a physical current space vector formed over one pulse-width modulation period.

18. The circuit board of claim 1, wherein the at least two measuring amplifier circuits are parallel to each other and have amplifications of different magnitude.

19. The circuit board of claim 18, wherein the amplifications of the at least two measuring amplifier circuits are selectable.

20. The system of claim 2, wherein a symmetrical pulse-width modulation provides for a switching state change in all three phases being symmetrical with respect to a midpoint of a pulse-width modulation period.

* * * * *